United States Patent
Giorgi et al.

(10) Patent No.: US 9,634,767 B2
(45) Date of Patent: Apr. 25, 2017

(54) POWER CONTROL IN BIDIRECTIONAL WDM OPTICAL LINK

(71) Applicant: Telefonaktiebolaget L M Ericsson (publ), Stockholm (SE)

(72) Inventors: Luca Giorgi, Ponsacco (IT); Fabio Cavaliere, Vecchiano (IT); Fabio Falconi, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 14 days.

(21) Appl. No.: 14/647,213

(22) PCT Filed: Dec. 10, 2012

(86) PCT No.: PCT/EP2012/074966
§ 371 (c)(1),
(2) Date: May 26, 2015

(87) PCT Pub. No.: WO2014/090278
PCT Pub. Date: Jun. 19, 2014

(65) Prior Publication Data
US 2015/0304033 A1   Oct. 22, 2015

(51) Int. Cl.
*H04B 10/00* (2013.01)
*H04B 10/2507* (2013.01)
(Continued)

(52) U.S. Cl.
CPC ..... *H04B 10/2507* (2013.01); *H04B 10/2503* (2013.01); *H04B 10/27* (2013.01);
(Continued)

(58) Field of Classification Search
CPC H04B 10/2507; H04B 10/27; H04B 10/2503; H04B 10/2972; H04J 14/02; H04J 14/0221
See application file for complete search history.

(56) References Cited

U.S. PATENT DOCUMENTS

| | | | | |
|---|---|---|---|---|
| 5,959,764 A | * | 9/1999 | Edagawa | G02F 2/004 359/245 |
| 6,084,704 A | * | 7/2000 | Button | H04B 10/2972 359/337 |

(Continued)

OTHER PUBLICATIONS

Ko, J., et al., "Estimation of Performance Degradation of Bidirectional WDM Transmission Systems Due to Rayleigh Backscattering and ASE Noises Using Numerical and Analytical Models", Journal of Lightwave Technology, vol. 21, No. 4, Apr. 1, 2003, pp. 938-946, IEEE.

(Continued)

*Primary Examiner* — Danny Leung
(74) *Attorney, Agent, or Firm* — Coats & Bennett, PLLC

(57) ABSTRACT

A bidirectional WDM optical communications link has WDM signals sent in opposite directions along a shared optical path and using at least one common wavelength. An optical amplifier (20, 21, 22, 70, $A_1^D$, $A_2^U$, $A_2^D$) optically amplifies (144) a first WDM signal separately from a second WDM signal in the other direction. This separated optical amplification is controlled (134) according to indications of transmission quality at the common wavelength, to alter the relative optical powers of the first and second WDM signals to enable crosstalk at the common wavelength to be limited. Cross talk at the common wavelength can be improved by rebalancing relative amounts of cross talk in the different directions, to enable the capacity benefits of using a common wavelength for both directions to be obtained while using greater optical signal power. This is particularly useful where the optical power is asymmetric, such as in WDM PON systems.

16 Claims, 13 Drawing Sheets

(51) Int. Cl.
*H04J 14/02* (2006.01)
*H04B 10/297* (2013.01)
*H04B 10/25* (2013.01)
*H04B 10/27* (2013.01)

(52) U.S. Cl.
CPC .......... *H04B 10/2972* (2013.01); *H04J 14/02* (2013.01); *H04J 14/0221* (2013.01)

(56) References Cited

U.S. PATENT DOCUMENTS

| | | | | |
|---|---|---|---|---|
| 6,137,604 | A * | 10/2000 | Bergano | H04B 10/2525 385/122 |
| 6,323,994 | B1 * | 11/2001 | Li | H04B 10/2941 359/341.1 |
| 6,483,636 | B1 * | 11/2002 | Sugaya | H01S 3/06754 359/337.2 |
| 7,254,344 | B2 * | 8/2007 | Kim | H04B 10/2587 398/179 |
| 8,224,183 | B1 * | 7/2012 | Iannone | H04B 10/2914 398/100 |
| 8,238,751 | B1 * | 8/2012 | Iannone | H04B 10/2503 385/24 |
| 8,699,881 | B1 * | 4/2014 | Iannone | H04J 14/0221 398/100 |
| 2003/0142978 | A1 * | 7/2003 | Lee | H04B 10/032 398/34 |
| 2003/0206740 | A1 * | 11/2003 | Lee | H04B 10/503 398/79 |
| 2006/0024066 | A1 * | 2/2006 | Fujiwara | H04B 10/2587 398/183 |
| 2008/0031621 | A1 * | 2/2008 | Kuo | H04J 14/0221 398/26 |
| 2008/0089692 | A1 * | 4/2008 | Sorin | H04J 14/02 398/135 |
| 2015/0304033 | A1 * | 10/2015 | Giorgi | H04J 14/0221 398/72 |

OTHER PUBLICATIONS

Liaw, S-K, et al., "Rayleigh backscattering induced power penalty on bidirectional wavelength-reuse fiber systems", Optics Communications, vol. 188, Issues 1-4, Feb. 1, 2001, pp. 63-67, Elsevier B.V.

* cited by examiner

POWER CONTROL IN BIDIRECTIONAL WDM OPTICAL LINK

FIELD

The present invention relates to methods of operating a bidirectional WDM optical link, to corresponding apparatus for controlling WDM signals in a bidirectional WDM optical communications link, to bidirectional WDM optical communications links having a shared optical path, and to corresponding computer programs.

BACKGROUND

In transport networks, WDM technology particularly DWDM technology offers many benefits in terms of bandwidth capabilities and scalability. Such networks can be passive (PON) or active. WDM-PON brings this benefit most notably in access networks, offering high capacity (currently upgradeable to 10 Gb/s), long distances, no bandwidth contention (virtual point-to-point) and service transparency, together with the possibility of smooth upgrades (per channel) in the protocol and in the bit-rate. WDM-PON is an emerging technology also for mobile backhaul, since broadband services and bandwidth demands are quickly increasing. A conventional WDM-PON is realized with a tree topology with a passive AWG at the remote node (RN) acting as a distribution node for mux/demux of the channels. This topology supports a high number of ONTs with the same kind of ONT for any AWG port (colorless).

It is known to use different wavelengths for the upstream and downstream signals. To increase system capacity, it is possible to use the same wavelengths for both directions, known as wavelength reuse, but this can give rise to optical cross talk interference, depending partly on the relative optical powers of the signals.

It is also known to provide WDM PONs with bidirectional optical amplification to enable an increase in the optical reach, or in the number of optical drops on each channel.

Bidirectional optical amplification is well known to be critical, due to the RIN generated by multiple reflections of amplified light, triggered by lumped reflections or Rayleigh Backscattering (RBS) in fiber (as explained in "Estimation of Performance Degradation of Bidirectional WDM Transmission System Due to Rayleigh Backscattering and ASE Noise Using Numerical and Analitical Models" J. Ko, S. Kim, J. Lee, S. Won, Y. S. Kim, J. Jeong. Journal of Lightwave Technology, Vol. 21, No 4, April 2003). This is why it is advisable to separately amplify the two propagation directions, e.g. by using optical circulators, even in bidirectional links.

Also in this case, however, interferometric cross-talk can arise between downstream and upstream channels due to bad isolation of optical components or, again, optical reflections in the link. This explains why any WDM system based on wavelength reuse proposed so far is passive. Nevertheless, optical amplification could significantly expand the application range of those systems, e.g. covering network scenarios where the average distance between user and central office is increased following sites consolidation or for service upgrade of deployed PONs with passive splitters.

Several wavelength reuse techniques have been proposed to realize low-cost wavelength agnostic (=colorless) WDM interfaces in bidirectional optical links, e.g. saturated or feed-forward controlled RSOAs or remodulation schemes such as FSK/ASK, IRZ/RZ, Manchester or 8B10B/NRZ, etc. All these techniques mitigate the cross-talk between opposite propagation directions but in the presence of optical amplification they may suffer from an unacceptable increase the power level of interfering light.

SUMMARY

Embodiments of the invention provide improved methods and apparatus. According to a first aspect of the invention, there is provided a method of operating a bidirectional WDM optical communications link having a shared optical path shared by first and second WDM signals sent in opposite directions along the shared optical path and using at least one common wavelength. Indications of transmission qualities of the at least one common wavelength, of the first and second WDM signals are provided. The first WDM signal is optically amplified whilst it is separated from the second WDM signal, and the optical amplification is controlled according to the indications of transmission quality. This means the relative optical powers of the first and second WDM signals are altered, for mitigating crosstalk at the common wavelength.

A benefit of being able to alter relative optical power for the two directions is that the cross talk problem can be improved for example by rebalancing relative amounts of cross talk in the different directions. Thus the capacity benefits of using a common wavelength for both directions can be obtained while using greater optical signal power. This greater optical signal power can mean the optical reach is extended or the numbers of drops can be increased for example. By controlling the WDM signal rather than only controlling the individual wavelengths separately, the number of optical components involved can be limited, the control is simplified and the arrangement is more scalable to larger numbers of wavelengths. By controlling optical power according to the transmission qualities in both directions, the available optical margin in both directions can be used more efficiently, or rebalanced so that the available margin in one direction is taken to improve the optical margin in the other direction for example. The method is applicable to symmetrical links or to non symmetrical links such as optical PONs, and is compatible with other methods such as control of individual wavelengths, or of other optical characteristics such as polarisation or modulation format. See FIGS. 1 and 2 for example as described below.

Any additional features can optionally be added to these features, or can be disclaimed, and some such additional features are described in more detail below. One such additional feature is a step of separating the first and second WDM signals before the optical amplifying step. This can avoid the need to keep the two signals separate up to the amplifying location. Another such additional feature is the optical amplifying step being arranged to occur before the first WDM signal enters the shared optical path. A benefit of controlling optical amplification before the cross talk occurs is that can enable a more direct effect on crosstalk whereas only amplifying afterwards has an indirect effect by helping enable a lower transmission power. By controlling the relative optical powers, the optical power levels can now be optimised for both directions. This amplification of the WDM signal or signals, can enable more efficiency in terms of hardware and more dynamic range than other methods such as tuning output powers of individual wavelength transmitters for example. See FIGS. 1, 3, 12 for example.

Another such additional feature is the optical amplifying step being arranged to occur before the first WDM signal enters the shared optical path and after the first WDM signal leaves the shared optical path. A benefit of this is that cross talk control can be at least partly decoupled from the desired optical power level at the optical receiver. This in turn means that the cross talk control can have a wider range, which can enable better optimisation, or use with more asymmetric optical power levels for example. See FIGS. 3, 6 and 11 for example.

Another such additional feature is the further step of optically amplifying the second WDM signal. A benefit of this is that the cross talk in both directions can be controlled more effectively. See FIGS. 6 to 9, 11 to 14 for example.

Another such additional feature is a step of determining which direction of transmission of the optical signals has worse transmission quality, and carrying out at least one of the following steps: for that worse direction, increasing the optical power level before the WDM signal enters the shared optical path, and decreasing the optical power level after it leaves the shared optical path, where the cross talk is generated, and for the other direction, decreasing the optical power level before, and increasing the optical power level after, the shared optical path where the cross talk is generated. A benefit is that the signal to noise ratio can be improved in the signal which has worse quality, or the signal to noise ratio can be reduced in the signal which was found to be better quality. In both cases the available optical margin can be shared more equally between the two directions and thus optical reach or other limitation can be optimised. See FIGS. 5, 8, 9 for example.

Another such additional feature is the link being asymmetrical in terms of optical transmitters at each end. This is notable as the method can compensate for, or exploit, the asymmetry of optical characteristics and provide more balanced, or otherwise optimised, transmission qualities. See FIGS. 11 to 14 for example.

Another such additional feature is the method when used in a passive optical network and having the step of using a wavelength reuse transmitter to transmit the common wavelength to form part of the second WDM signal. A benefit is that the optical power asymmetry and thus cross talk asymmetry inherent in such wavelength reuse arrangements can be compensated better by controlling the optical characteristics separately in the different directions as discussed above. See FIGS. 11 to 14.

Another such additional feature is the transmission quality comprising a bit error rate. A benefit of this is that it is in many cases simpler and more cost effective to obtain than alternatives such as optical signal to noise ratio or Q factor or receiver eye characteristics which are typically dependent on a modulation type. Such alternatives are conceivable and have some of their own benefits such as providing an indication of quality even when no bit errors are present. See FIG. 10 for example.

Another aspect provides apparatus for carrying out the method as set out above.

Another aspect provides apparatus for controlling WDM signals in a bidirectional WDM optical communications link having a shared optical path shared by first and second WDM signals sent in opposite directions along the shared optical path and using at least one common wavelength. The apparatus has an optical amplifier configured to amplify the first WDM signal whilst it is separated from the second WDM signal, and a controller configured to receive indications of transmission qualities of the at least one common wavelength, of the first and second WDM signals. The controller is configured to control the optical amplifier according to the indications of transmission quality, to alter the relative optical powers of the first and second WDM signals to mitigate crosstalk at the common wavelength. This provides apparatus corresponding to the above method aspects. See FIG. 1 for example.

An additional apparatus feature is optical circulators (OC) to separate the WDM signals from the shared path, and to recombine them onto the shared path. See FIG. 1 for example.

Another such additional feature is the optical amplifier comprising a booster amplifier configured to amplify the first WDM signal before it enters the shared optical path. See FIG. 3, FIG. 12, for example.

Another such additional feature is the optical amplifier also comprising a pre-amplifier element configured to amplify the first WDM signal after it has left the shared optical path. See FIG. 3, FIG. 13, FIG. 14 for example.

Another such additional feature is the optical amplifier being configured to pass the second WDM signal without amplification. A benefit is that cross talk can be controlled with less complexity if one direction is passed. See FIGS. 1, 12 and 14 for example.

Another such additional feature is the controller being configured to determine which direction of transmission of the optical signals has worse transmission quality, and to control the cross talk by at least one of the following: a) for that worse direction, increasing the optical power level before the respective WDM signal enters the shared optical path, and decreasing the optical power level after it leaves the shared optical path, and b) for the other direction, decreasing the optical power level before the respective WDM signal enters the shared optical path, and increasing the optical power level after it leaves the shared optical path. See FIGS. 5, 8 and 9.

Another such additional feature is the link being asymmetrical and having optical transmitters at each end that have different optical power level capabilities. Another aspect provides a remote node for a WDM PON network and having a WDM multiplexer and demultiplexer, and having the apparatus for controlling WDM signals as set out above. A benefit is that this enables application to WDM PON type networks which are intrinsically asymmetrical. See FIGS. 11 to 14 for example.

Another aspect provides an optical line terminal for a WDM PON network and having a WDM multiplexer and demultiplexer, and having the apparatus for controlling WDM signals as set out above.

Another aspect provides a bidirectional WDM optical communications link having a shared optical path shared by first and second WDM signals sent in opposite directions in a symmetrical manner along the shared optical path and using at least one common wavelength, and having apparatus for controlling WDM signals as set out above. See FIGS. 6 and 7 for example.

Another aspect provides a computer program on a computer readable medium having instructions which when executed by a processor cause the processor to carry out any of the methods set out above.

Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
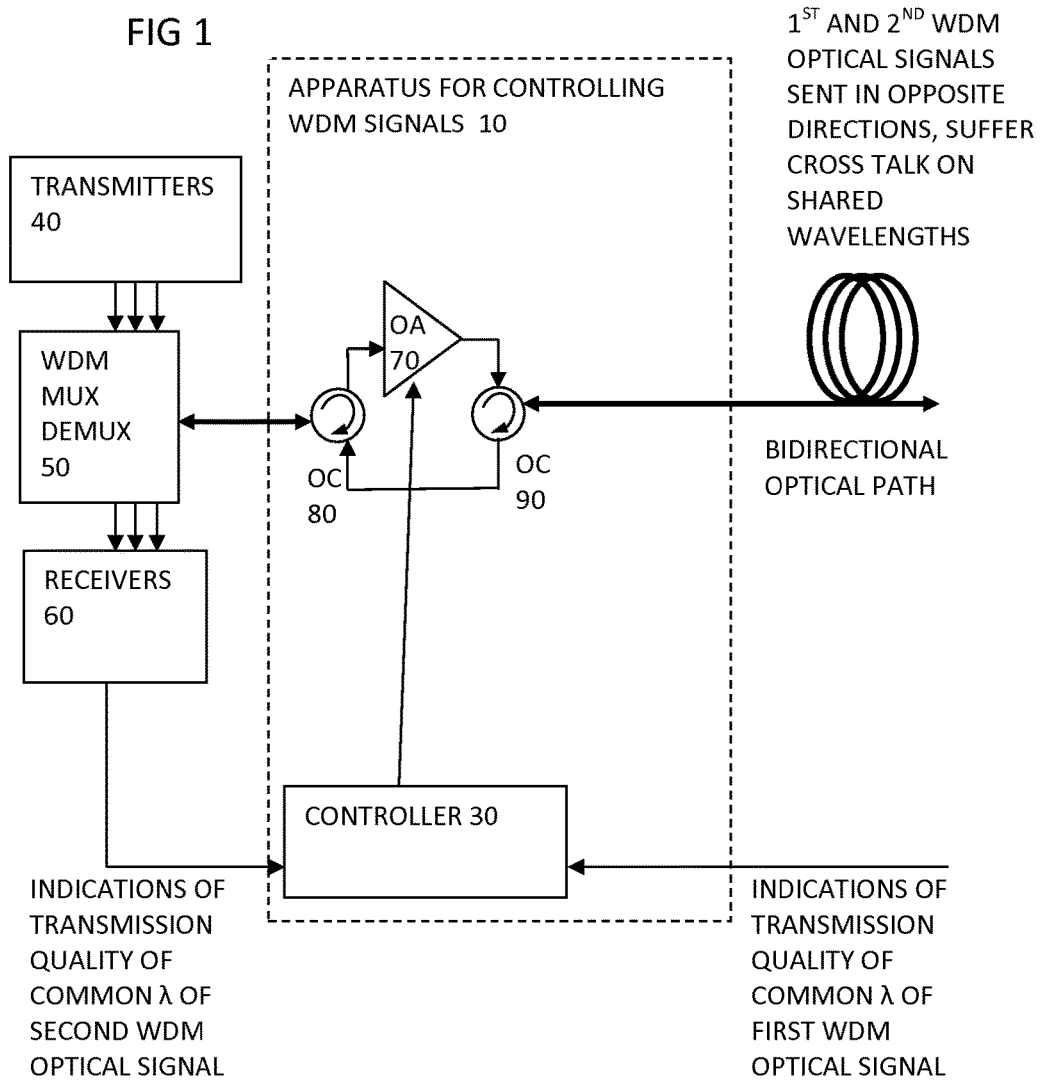
FIG. 1 shows a schematic view of parts of a communications link including apparatus for controlling WDM signals in a bidirectional WDM optical communications link.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

ABBREVIATIONS

AWG Array Waveguide Gratings
BER Bit Error Rate
BIDI-OA Bidirectional Optical Amplifier
EDFA Erbium Doped Fiber Amplifier
Optical Circulator
OLT Optical Line Termination
ONT Optical Network Termination
OSXR Optical Signal to cross-talk Ratio
PON Passive Optical Network
RBS Rayleigh Backscatter
RIN Relative Intensity Noise
RN Remote Node
RX Receiver
TX Transmitter
Xtalk Cross-talk
WDM Wavelength Division Multiplexing
WR Wavelength reuse

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described apparatus, nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to controllers, processors, hardware, processing hardware or circuitry can encompass any kind of logic or analog circuitry, integrated to any degree, and not limited to general purpose processors, digital signal processors, ASICs, FPGAs, discrete components or logic and so on.

References to a processor are intended to encompass implementations using multiple processors which may be integrated together, or co-located in the same node or distributed at different locations for example.

INTRODUCTION

By way of introduction to the embodiments, how they address some issues with conventional designs will be explained. Current techniques have some problems as follows. As downstream and upstream wavelengths are shared in wavelength reuse systems, any cross-talk source between the two opposite directions must be taken under control. For example, cross-talk can arise from bad isolation in optical components or optical reflections.

This makes optical amplification critical. For instance, if a bidirectional optical amplification scheme were to be placed between an OLT and a feeder fiber in a WDM PON system, with optical amplifiers acting as booster and pre-amplifier, respectively, any increase the gain in order to increase the power budget can have effects as follows. If, as it actually happens, the isolation of the output optical circulator is not perfect, a significant amount of power generated by the downstream booster amplifier interferes with the upstream signal at the input of the upstream preamplifier, generating cross-talk. The problem is quite serious considering that, in practical systems, downstream output power is much higher than upstream input power at the pre-amplifier.

Accordingly, to address these issues, various performance optimization methods and apparatus in bidirectional optically amplified systems are shown, some passive, some active, some using remodulation. They can be applied for example in Wavelength Division Multiplexing (WDM) access and mobile backhauling networks, based on wavelength reuse techniques to support symmetric bit rate traffic at low cost, to maximize the spectral efficiency and mitigate channel asymmetry effects, e.g. due the different propagation delay in the two directions.

Figure 6:
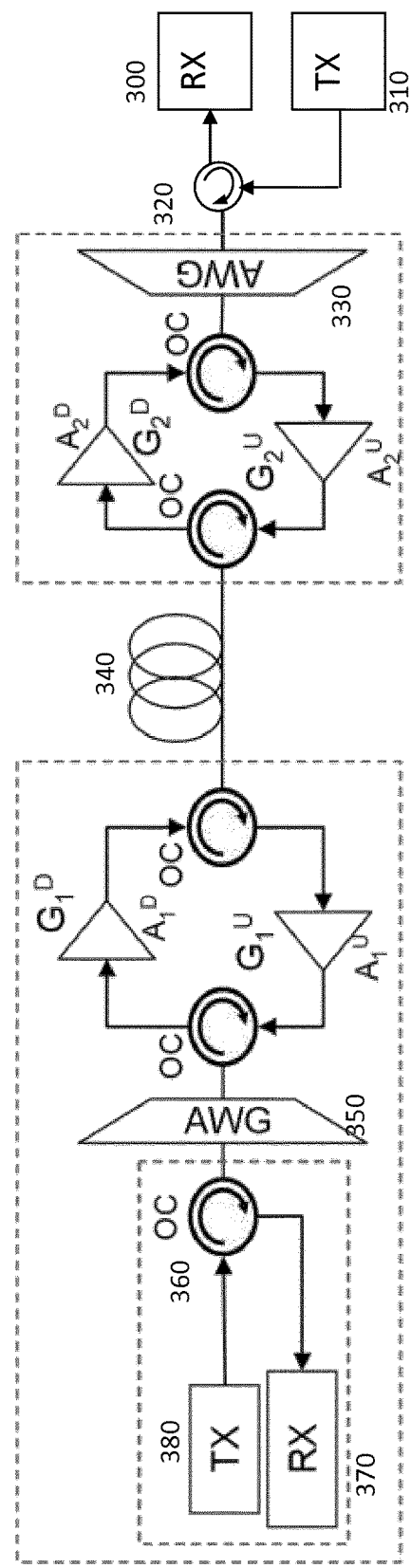
FIG. 6 shows embodiment having two BIDI-OA nodes at both sides.

In summary, some examples provide a BIDIrectional Optical Amplification (BIDI-OA) scheme for a wavelength reuse bidirectional system. Some examples exploit BIDI-OA applied at both sides of the trunk fiber to significantly increase the power budget. Some examples provide a power setting method to optimize the Optical Signal to Xtalk Ratio (OSXR) in the upstream and downstream directions. A bidirectional amplification node can be realized by means of two optical circulators and two EDFAs as shown in FIG. 6 and various other figures described below in more detail.

Figure 12:
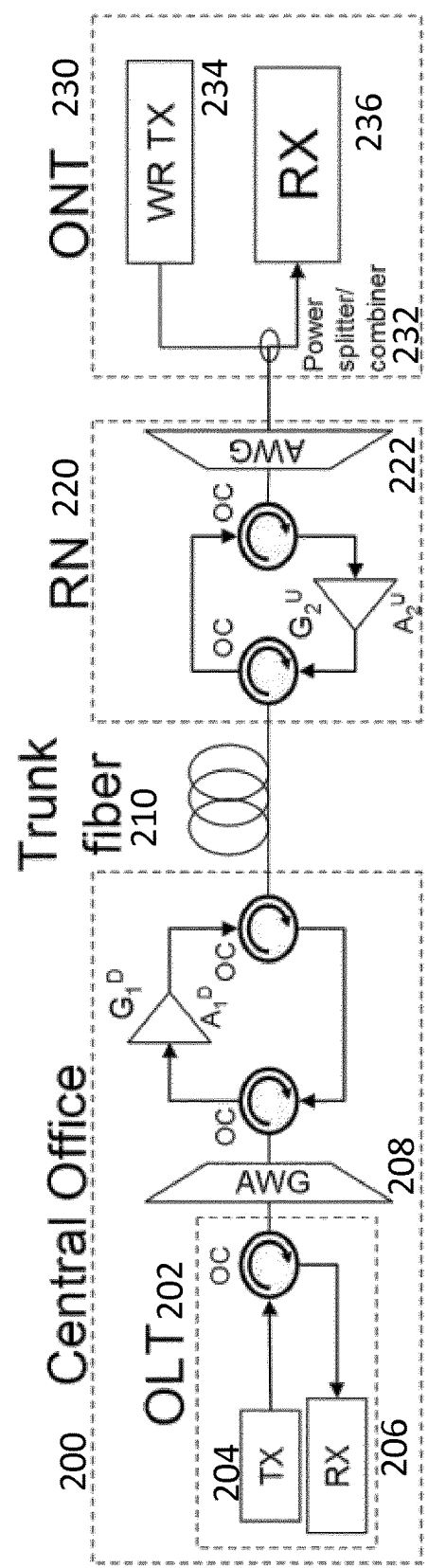
FIG. 12 shows a schematic view of another embodiment applied to a WDM PON and having BIDI-OAs as booster amplifiers with no pre amplifiers.
Figure 13:
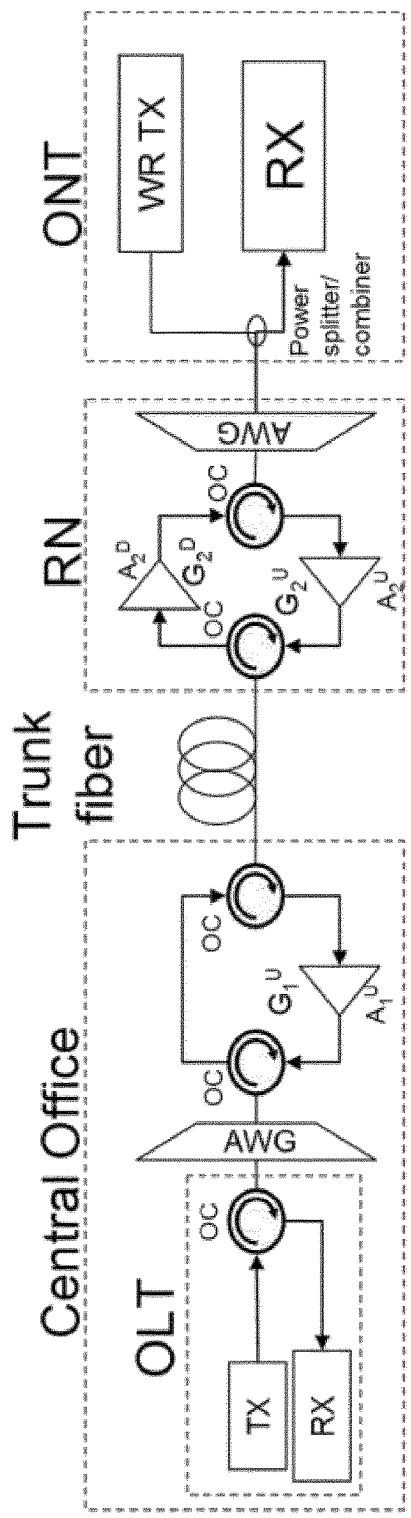
FIG. 13 shows a schematic view of another embodiment applied to a WDM PON and having BIDI-OAs, without a booster on the downstream signal
Figure 14:
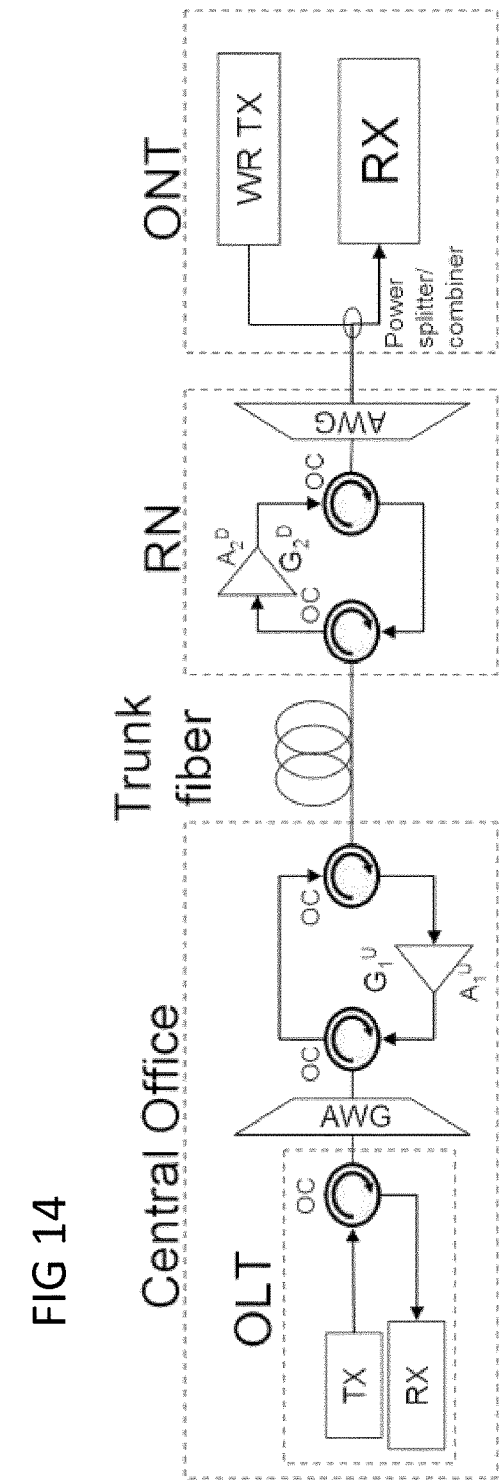
FIG. 14 shows a schematic view of another embodiment applied to a WDM PON and having BIDI-OAs, with only pre-amplifiers, no booster amplifiers.

Simplified BIDI-OA architectures where some optical amplifiers are missed are possible (FIGS. 12, 13 and 14). For example, the preamplifiers-only variant is useful in case of very short reach (less than 10 km) but high concentrated losses (e.g. due to re-use of installed PON infrastructure).

Figure 2:
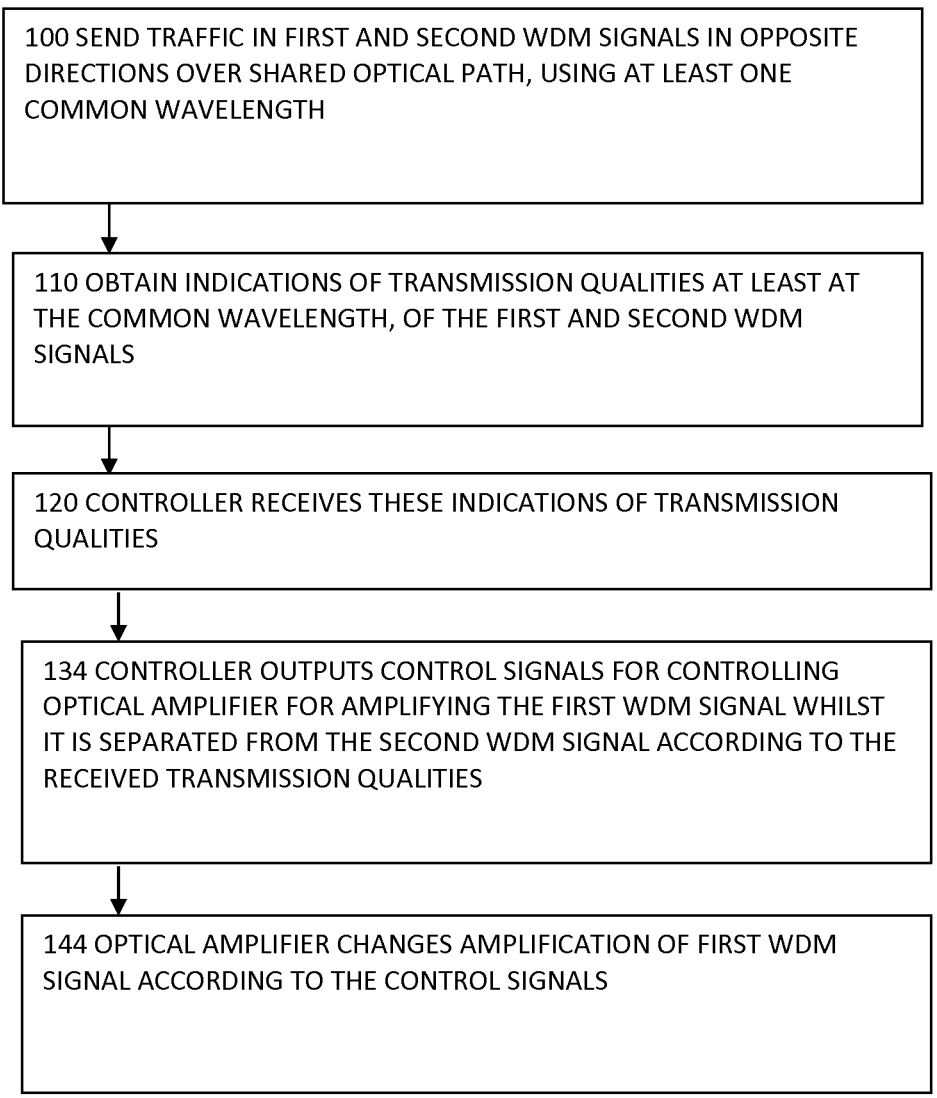
FIG. 2 shows steps in operating the apparatus of FIG. 1 or other embodiments.

FIGS. 1 and 2, a First Embodiment

FIG. 1 shows a schematic view of parts of a communications link including apparatus 10 for controlling WDM signals in a bidirectional WDM optical communications link having a shared optical path shared by first and second WDM signals sent in opposite directions along the shared optical path and using at least one common wavelength. Transmitters 40 are provided to supply wavelength which are wavelength division multiplexed by a mux/demux device 50 and fed onto the bidirectional shared optical path. The WDM mux/demux also separates and demultiplexes the optical signals in the other direction, and is coupled to provides these to receivers 60. An optical amplifier 70 is provided to amplify the first WDM signal separately from the second WDM signal, by separating the upstream and downstream signals using optical circulators 80, 90, at either side of the optical amplifier. In principle the OC 80 may not be needed if the WDM mux demux 50 keeps physically separate paths for the WDM signals in the two directions.

A controller 30 is configured to receive indications of transmission qualities of the at least one common wavelength, of the first and second WDM signals, and to control the optical amplifier according to the indications of transmission quality, to alter the relative optical powers of the first and second WDM signals to enable crosstalk at the common wavelength to be mitigated. The indications of transmission quality can come from the receivers at each end of the optical link as shown and can be based on detecting the optical quality or can be based on a quality of the electrical signal from the receiver, either before or after the received signal is digitised, or before or after some digital processing such as FEC for example. A bit error rate is an example of transmission quality.

By controlling optical amplification in one direction separately from the other, the relative optical powers in the two directions can be controlled, whether the second direction is controlled or not. Thus the cross talk can be limited or balanced in the two directions, which may provide an overall benefit even if it is actually increased in one direction. Thus performance can be improved, so that the benefits of optical amplification can be combined with the benefits of wavelength reuse. The controller can be implemented by a processor of any kind.

FIG. 2 shows steps in operating the apparatus of FIG. 1 or other embodiments. At step 100, traffic is sent in first and second WDM signals in opposite directions over the shared optical path, using at least one common wavelength. At step 110, indications of transmission qualities at least at the common wavelength are obtained for the first and second WDM signals. The controller receives these indications at step 120. At step 134, the controller outputs control signals for the controlling the optical amplifier to control the optical amplification separately in the two directions according to the received transmission qualities. At step 144, the optical amplifier responds to the control signals to change the amplification of the first WDM signal whilst it is separated from the second WDM signal.

Thus cross talk can be controlled, and even where cross talk is not the limiting factor, the better balancing of the optical powers in the two directions can help enable optical power budgeting to be more tightly controlled and enable reduced optical power margins for example, or reduced capital costs or reduced power consumption in operation.

Figure 3:
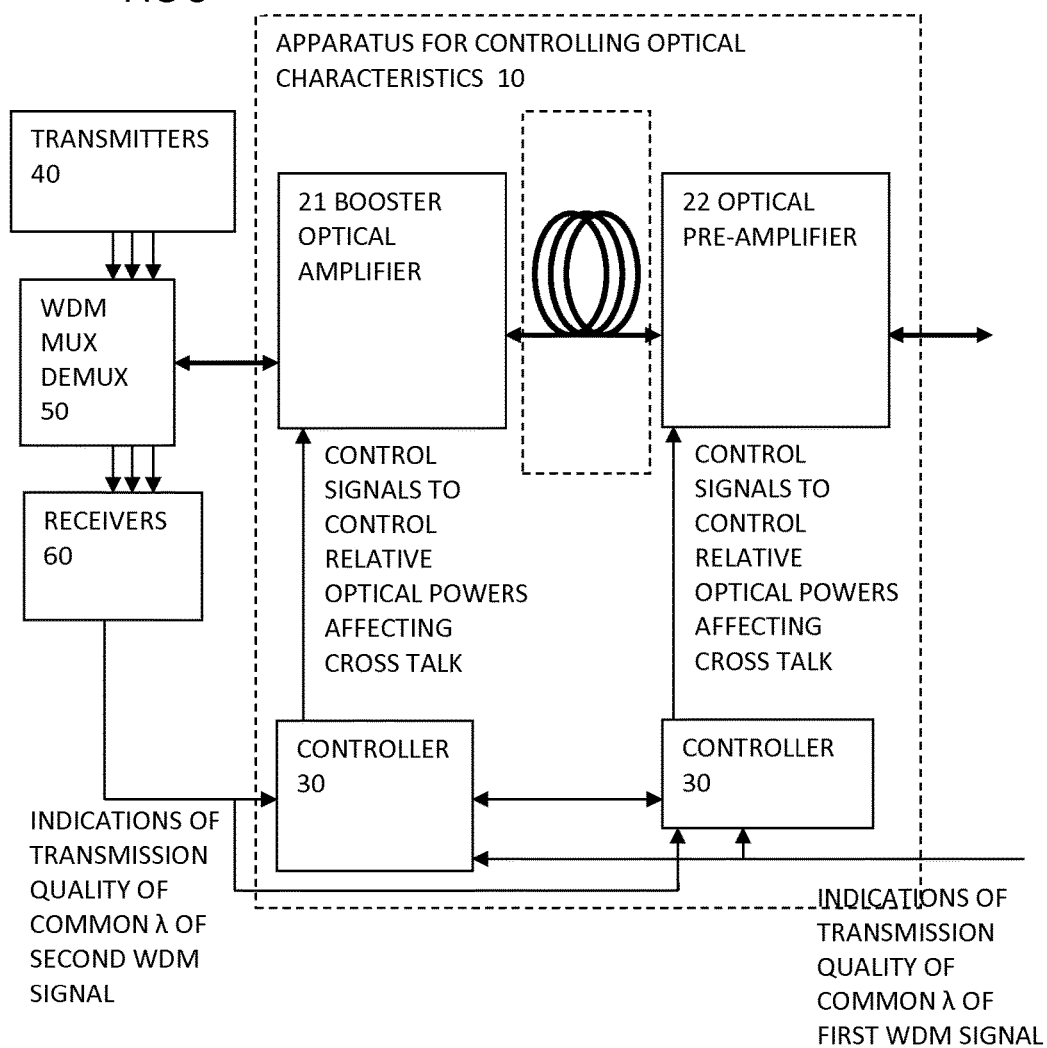
FIG. 3 shows another embodiment having amplification at both sides of the link.
Figure 4:
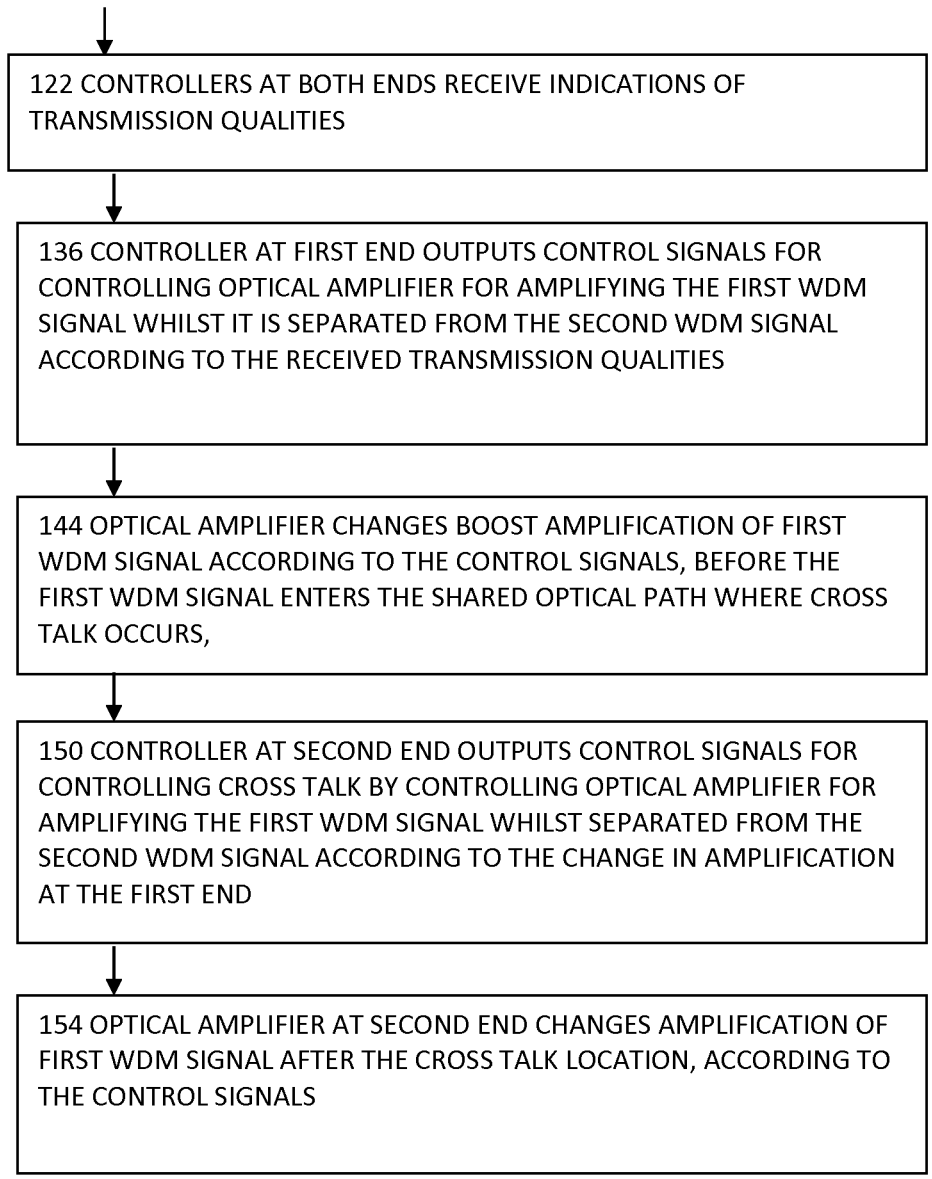
FIG. 4 shows steps in operating the apparatus of FIG. 3 or other embodiments.

FIGS. 3 and 4, a Further Embodiment

FIG. 3 shows a schematic view of parts of a communications link similar to FIG. 1 but having amplification at both sides of the link. Items corresponding to those shown in FIG. 1 are illustrated with the same reference numerals. In this case there is a booster optical amplifier 21 for amplifying the WDM signal before it enters the shared optical path, in this case a transmission fiber. The optical amplification is carried out whilst the first WDM signal is separated from the second WDM signal in the other direction. An optical pre-amplifier 22 is shown at the far side of the fiber, for amplifying the WDM signal after leaving the fiber transmission fiber, separately from the WDM signal in the other direction. Controllers 30 are provided at each end of the link, for providing control signals to the booster optical amplifier and the optical pre-amplifier respectively. In principle the WDM signals can be passed along more than one link, and can pass along other links or sections which are shared bidirectional or unshared unidirectional, so references to the shared optical path can mean any part or parts of the entire optical path shared by the WDM signals.

FIG. 4 shows steps in operating the apparatus of FIG. 3 or other embodiments. Traffic is sent in first and second WDM signals in opposite directions over the shared optical path, using at least one common wavelength. At step 122, indications of transmission qualities at least at the common wavelength are obtained for the first and second WDM signals and received by the controllers at the two ends. At step 136, the controller at the first end outputs control signals for controlling the optical amplifier for amplifying the first WDM signal whilst it is separated from the second WDM signal sent in the other direction. Again this control is made according to the received transmission qualities, to enable optimization for example by rebalancing of the transmission qualities in the two directions. At step 144 the booster optical amplifier changes boost amplification of the first WDM signal according to the control signals, before the first WDM signal enters the shared optical path.

At step 150 the controller at the second end outputs control signals for controlling the optical amplification of the pre-amplifier located after the transmission fiber (cross talk location) according to the change in amplification at the first end. This involves controlling the amplification separately from the control of the second WDM signal in the other direction. This can enable the changes in power to be compensated so that the receiver is not affected or is less affected by any changes in the amplification at the booster amplifier. At step 154, the optical pre-amplifier at the second end implements the change in amplification indicated in the control signals.

Figure 5:
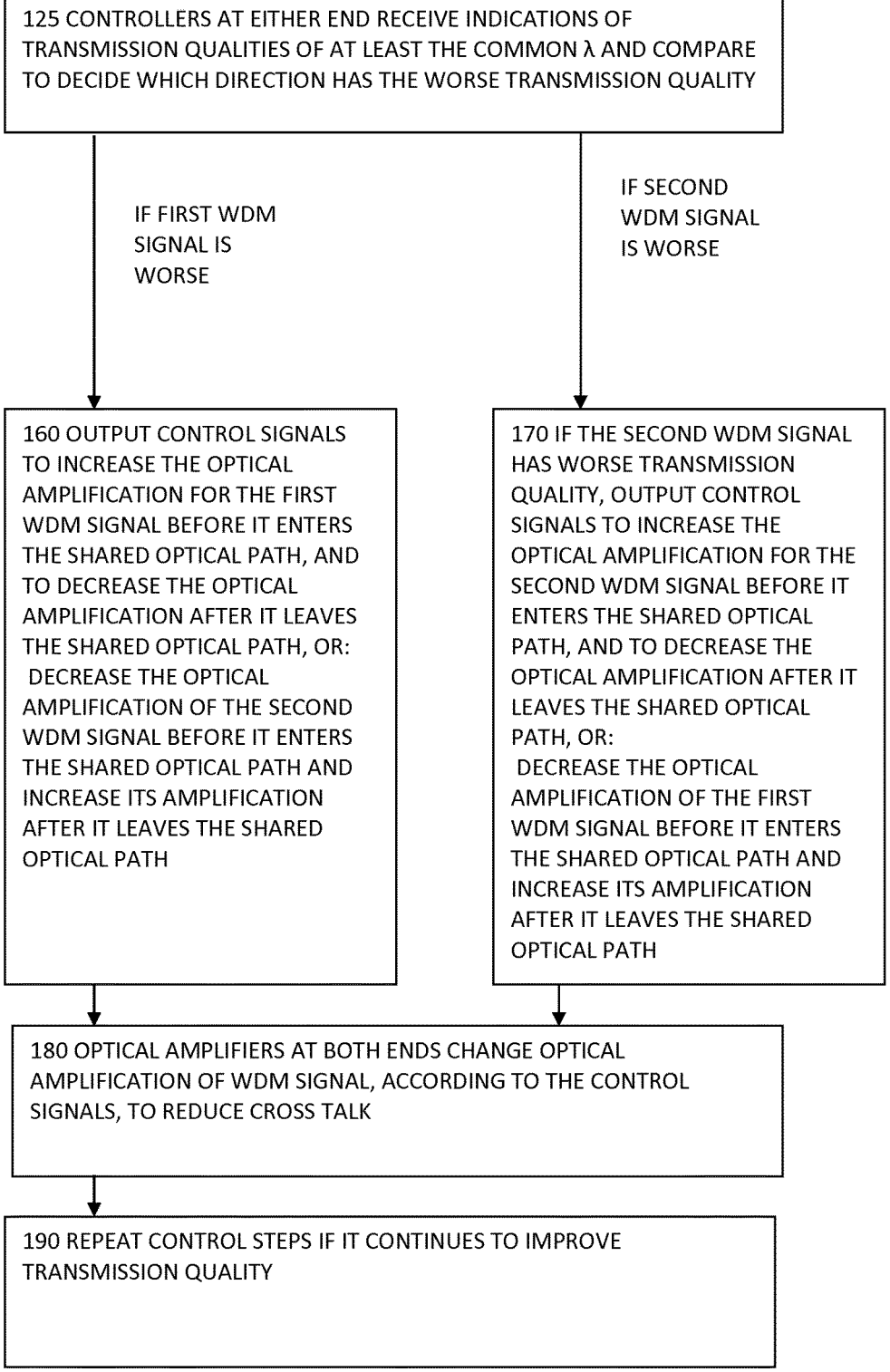
FIG. 5 shows steps in control according to a further embodiment with balancing

FIG. 5, Steps in Control According to a Further Embodiment with Balancing

FIG. 5 shows steps in operating the apparatus of FIG. 1, or FIG. 3 or other embodiments where there is control of optical amplification in one direction or in both directions separately. At step 125 a controller at either end receives indications of transmission qualities and decides which direction has worse transmission quality. If the first WDM signal is worse, at step 160 control signals are generated to increase the optical amplification for the first WDM signal before it enters the shared optical path where the cross talk occurs, and to decrease the optical amplification after leaving the shared optical path, or: the optical amplification of the second WDM signal is decreased before it enters the shared optical path and increased in amplification after leaving the shared optical path where the cross talk occurs.

If the second WDM signal is worse, at step 170 control signals are generated to increase the optical amplification for the second WDM signal before it enters the shared optical path, and to decrease the optical amplification after it leaves the shared optical path, or: the optical amplification of the first WDM signal is decreased before it enters the shared optical path and increased in amplification after leaving the shared optical path. At step 180 the optical amplifiers at both ends implement the changes in amplification according to the control signals. In each of the cases, the balance of transmission quality between the two directions can be improved, and thus overall the performance can be increased as there is no longer any excess quality margin in either direction. At step 190 the control steps can be repeated if doing so continues to improve the overall transmission quality, or can be ceased otherwise.

Figure 7:
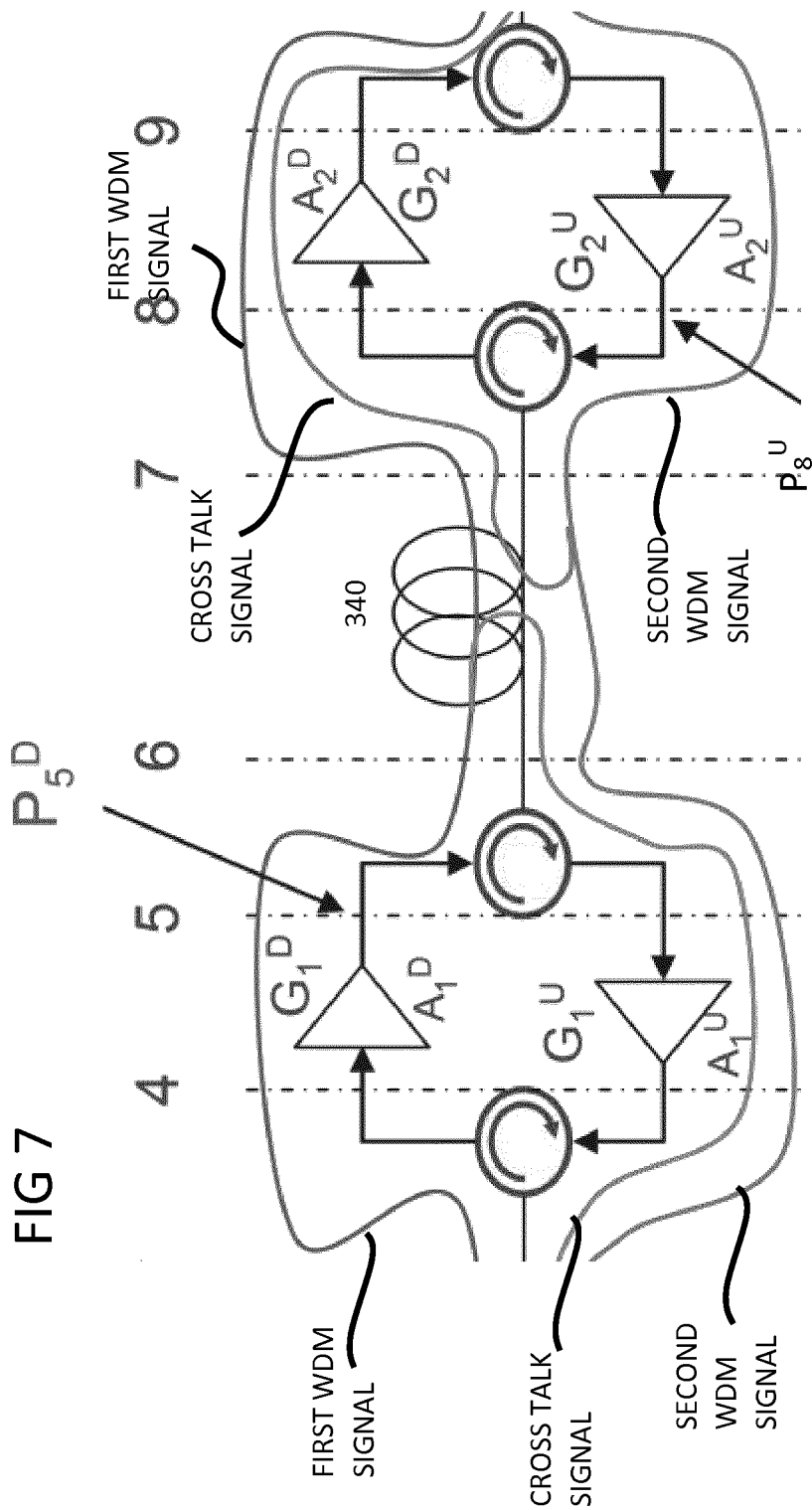
FIG. 7 shows a schematic view of parts of the link of FIG. 6, and showing paths taken by signals, FIGS. 8 and 9 each show two halves of a flow chart of steps in controlling the WDM signals according to another embodiment.

FIGS. 6, 7, Embodiment Having Two BIDI-OA Nodes at Both Sides

FIGS. 6 and 7 show schematic views of apparatus having two BIDI-OA nodes at both the sides of a trunk fiber. At one side of the transmission fiber 340, a transceiver has a transmitter TX 380, and receiver RX 370, for each of a number of wavelength channels. An optical circulator 360 is provided for combining or separating the signals of the two directions. The bidirectional path form here is coupled to an AWG 350, for WDM mux and demux. The bidirectional WDM signal path is then coupled to the apparatus for bidirectional optical amplification, involving optical circulators OC for separating and recombining the signals of the two directions, to enable separate control of amplification by amplifiers $A_1^D$ and $A_1^U$ respectively.

At the far side of the transmission fiber 340 there is similar apparatus for bidirectional amplification, an AWG 330, for WDM mux and demux, and a transceiver having a circulator 320, and for each wavelength, a receiver 300, and transmitter 310. The bidirectional amplification has separate control of amplification by amplifiers $A_2^D$ and $A_2^U$ respectively.

A controller (not shown explicitly here) can be used to set output power by means of gains $G_1$, $G_2$ respectively of the EDFAs installed in the BIDI-OA nodes. In FIG. 6, superscripts D and U indicate downstream direction and upstream directions, respectively. Superscript DB indicates downstream backscatter. Subscripts 1 or 2 represent near or far ends, and subscripts 4 to 9 as shown represent locations along the optical path as shown in FIG. 7. In the following discussion we will assume that:

Amplifiers $A_1^D$ and $A_2^U$ act as boosters for downstream and upstream WDM signals respectively. They work at constant output channel power.
  The amplifiers $A_1^U$ and $A_2^D$ act as pre-amplifiers for the upstream and downstream WDM signal respectively. They work at constant gain in some examples, or in some examples they have active control of their gain.
  All the optical circulators have equal insertion loss $IL_{circ}$.
  All the Array Waveguide Gratings (AWG) have equal insertion loss $IL_{AWG}$
  The fiber Rayleigh back scattering ratio BRR is constant for trunk fiber lengths longer than 15 km.

FIG. 7 shows a schematic view of parts of the link of FIG. 6, with additional wavy lines to show the path taken by an upstream signal (right to left in this case), a downstream signal (left to right in this case), crosstalk in the upstream direction caused by backscatter from the downstream signal, and cross talk in the downstream direction caused by backscatter from the upstream signal.

With reference to FIG. 7, optical signal power, optical reflection noise power and the optical signal to cross-talk noise ratio values at the OLT upstream receiver are:

$$P_1^U \,[dBm] = P_8^U G_1^U - IL_{Link} - IL_{AWG} - 4IL_{circ} \qquad [\text{Eq. 1}]$$

$$P_1^{DB} \,[dBm] = P_8^D + BRR + G_1^U - IL_{AWG} - 4IL_{circ} \qquad [\text{Eq. 2}]$$

$$OSXR_{OTL} \,[dB] = P_1^U - P_1^{DB} = P_8^U - P_5^D - IL_{Link} + BRR \qquad [\text{Eq. 3}]$$

Note that:

The input power signal $P_1^U$ ([Eq. 1]) is proportional to both the channel output power provided by $A_2^U$ booster ($P_8^U$) and the gain of the $A_1^U$ pre-amplifier ($G_1^U$). The $OSXR_{OLT}$ ([Eq. 3]) is proportional to the channel output power provided by the $A_2^U$ booster ($P_8^U$) and inversely proportional to the per-channel output power provided by the $A_1^D$ booster ($P_5^D$).

The same values at the Optical Network Termination (ONT) downstream receiver are:

$$P_{12}^D \,[dBm] = P_5^U + G_2^D - IL_{Link} - IL_{AWG} - 3IL_{circ} - IL_{splitter} \qquad [\text{Eq. 4}]$$

$$P_{12}^{UB} \,[dBm] = P_8^U - BRR + G_2^D - IL_{AWG} - 3IL_{circ} - IL_{splitter} \qquad [\text{Eq. 5}]$$

$$OSXR_{ONT} \,[dB] = P_{12}^D - P_{12}^{UB} = P_5^D - P_8^U - IL_{Link} + BRR \qquad [\text{Eq. 6}]$$

Note that:

The input signal power $P_{12}^D$ ([Eq. 4]) is proportional to both the channel output power provided by $A_1^D$ booster ($P_5^D$) and the gain of the $A_2^D$ pre-amplifier ($G_2^D$). The $OSXR_{ONT}$ ([Eq. 6]) is proportional to the channel output power provided by $A_2^U$ booster ($P_5^D$) and inversely proportional to the per-channel output power provided by $A_1^D$ booster ($P_8^U$).

In a wavelength reuse system the upstream signal is more penalized with respect to the downstream signal due residual modulation due the downstream light coming from the central office and the double transmission distance. So, setting the power levels in order to have the same OSXR in downstream and upstream would result into unbalanced BER performance with downstream $BER_{OLT}$ (measured at the ONT receiver) better than upstream $BER_{ONT}$ (measured at the OLT receiver). For this reason, we will try to balance BER rather than OSXR values.

Figure 8:
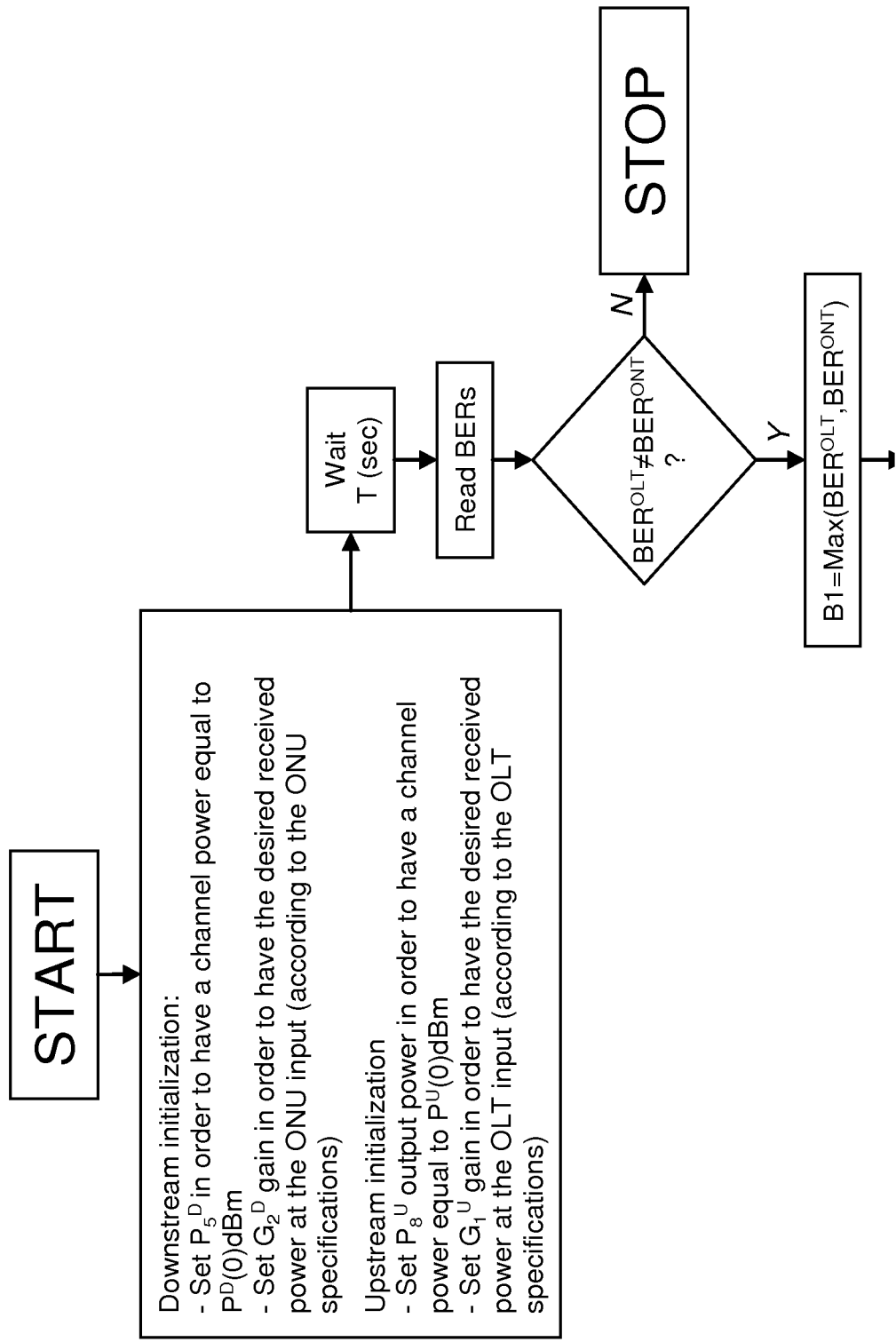
Figure 9:
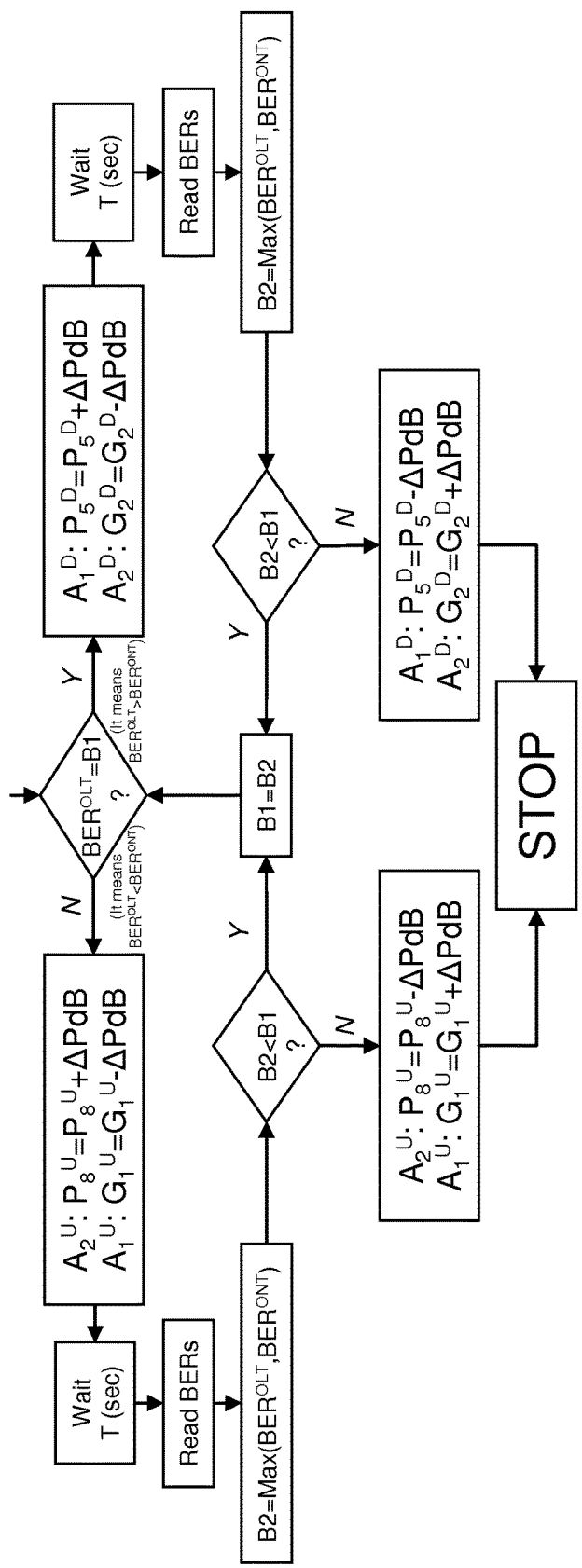

FIGS. 8 and 9, Flow Chart

Considering the previous equations regarding received powers, OSXRs and amplifier output powers and gains, the following method is proposed to set output power and gain values for the optical amplifiers.

Set the optical gains of the pre-amplifiers ($A_1^U$ and $A_2^D$) in order to meet predetermined received powers values (e.g. nominal receiver sensitivities or ONT injection powers).

Gradually change the output powers of booster amplifiers $A_1^D$ and $A_2^U$, according to the flowchart in FIGS. 8 and 9, in order to jointly minimize the bit error rate (BER) of the worst OLT receiver $BER_{OLT}$ and the worst ONT receiver $BER_{ONT}$.

According to the previous equations, setting the ratio between the output powers we univocally define the OSXR at both the receivers. The method also applies to simplified BIDI-OA variants such those shown in FIGS. 11 to 14.

The working principle of the method, detailed in a flow chart spread across FIGS. 8 and 9, is outlined in the following.

The amplifiers are initialized setting a pre-determined arbitrary output power level on the boosters and setting the preamplifiers to meet ONT and OLT input power specifications.

After T=Tamp+Tmeas seconds, where Tamp is the time to reach the amplifiers steady state and Tmeas is the time window necessary for accurate BER measurement, we read the BER values on both the OLT and ONT receivers and we check if they are different or not.

If the BERs are equal the method stops, otherwise we look at what is the maximum BER between $BER_{OLT}$ and $BER_{ONT}$. This much is shown in FIG. 8. Then, moving to FIG. 9, in the first box of FIG. 9, we test to see if $BER_{OLT}$ is the maximum one. If yes, we increment by $\Delta P$ [dB] the downstream booster output power $P_5^D$ as shown in the right hand path of FIG. 9. In such a way, $OSNR_{ONT}$ improves and $OSNR_{OLT}$ impairs.

Then, we decrement by $\Delta P$ [dB] the downstream preamplifier gain $G_2^D$ in order to maintain the same optical power at the ONT input, and then wait for the effects to settle, before reading BERs again.

If, instead, $BER_{ONT}$ is the maximum one, we take the left path in FIG. 9 and increment by $\Delta P$ [dB] the upstream booster output power $P_8^U$. Such a way $OSNR_{OLT}$ improves and $OSNR_{ONT}$ impairs. Then we decrement by $\Delta P$ [dB] the upstream preamplifier gain $G_1^U$ in order to maintain the same optical power at the OLT input.

After a wait for T seconds to allow for settling, we read the new BER values. If the new maximum value B2 is greater than the previous one B1, then the method hasn't provided the expected benefit so we come back to the previous state and the method stops. Otherwise a further method iteration is run. Then as shown, the method stops, though of course further iterations could be run.

This optical amplification scheme and method enable combining the high spectral efficiency typical of wavelength reuse systems with the long distance reach typical of regular WDM systems where different wavelengths or fibers are used instead for the two propagation directions.

Figure 10:
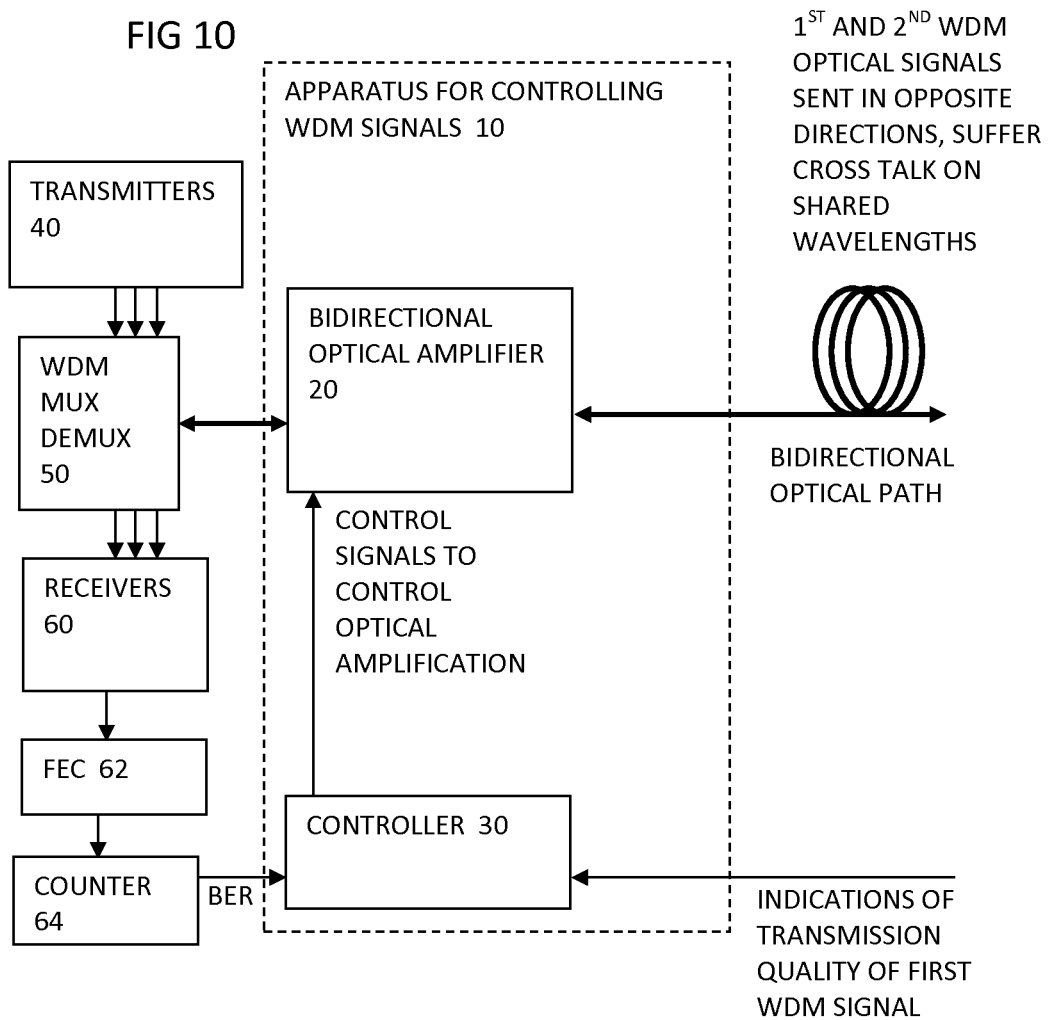
FIG. 10 shows a schematic view of another embodiment having BER as indication of transmission quality.

FIG. 10, Embodiment Having BER as Indication of Transmission Quality

FIG. 10 shows a schematic view of apparatus similar to that of FIG. 1, but with a FEC part 62 coupled to the receivers. This outputs bit error indications to a counter 64, which determines a rate of errors and outputs a bit error rate BER indication to the controller 30, as an example of an indication of transmission quality. As before, the controller can determine how to change the amplification based on the BER, and can output control signals to the bidirectional optical amplifier 20 which can amplify each direction of the bidirectional optical path separately.

Figure 11:
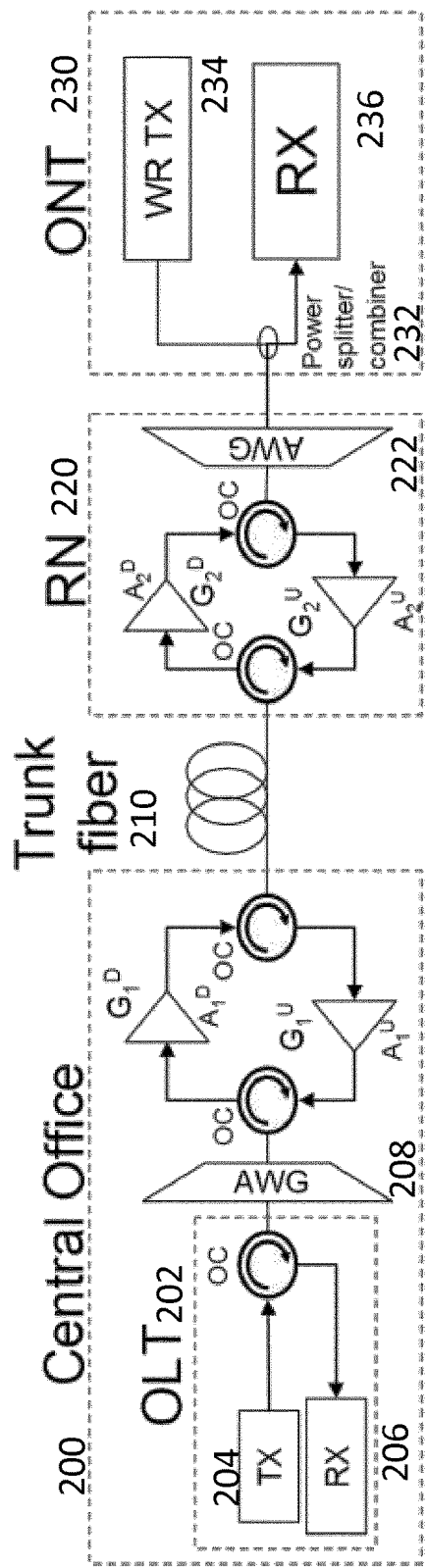
FIG. 11 shows a schematic view of another embodiment applied to a WDM PON and having BIDI-OAs.

FIG. 11, WDM PON Example with BIDI-OA

FIG. 11 shows an example similar to that of FIG. 6, but applied to a WDM PON, and corresponding parts are shown with corresponding reference signs. In this case, one end of the link is an OLT in a central office 200. The other end of the link is at a remote node RN 220, having the bidirectional amplifier, and AWG 222. The transmitter is in the form of a wavelength reuse transmitter WRTX 234 in an ONT 230, having a power splitter/combiner 232. Any kind of wavelength reuse transmitter can be used, for example a loop back optical amplifier, or a reflective type, as would be known to those skilled in the art.

FIG. 12: WDM PON with BIDI-OA with Only Booster Amplifiers

FIG. 12 shows an example similar to that of FIG. 11, but with no pre-amplifiers only booster amplifiers. Corresponding parts are shown with corresponding reference signs. This can simplify the control, but reduce the flexibility.

FIG. 13: WDM PON with BIDI-OA without Booster on Downstream Signal

FIG. 13 shows an example similar to that of FIG. 11, but with no booster amplifier on the downstream path. Corresponding parts are shown with corresponding reference signs. This is feasible because the downstream signal typically has a much higher power level anyway. In another example, a controllable optical attenuator could be used at least for the downstream path to provide some control.

FIG. 14: WDM PON with BIDI-OA with Only Pre-Amplifiers

FIG. 14 shows an example similar to that of FIG. 11, but with no booster amplifiers on both the downstream path and the upstream path. Corresponding parts are shown with corresponding reference signs. This can be useful for example for short reach and high power budget systems. Although there is less direct control of any cross talk, the better balancing of the optical powers in the two directions can help enable optical power budgeting to be more tightly controlled and enable reduced optical power margins for example, and reduced capital costs and reduced power consumption in operation.

CONCLUDING REMARKS

A bidirectional WDM optical communications link has WDM signals sent in opposite directions along a shared optical path and using at least one common wavelength. An optical amplifier 20, 21, 22, 70, $A_1^D, A_2^U, A_1^U, A_2^D$ optically amplifies 144 a first WDM signal separately from a second WDM signal in the other direction. This separated optical amplification is controlled 134 according to indications of transmission quality at the common wavelength, to alter the relative optical powers of the first and second WDM signals to enable crosstalk at the common wavelength to be limited. Cross talk at the common wavelength can be improved by rebalancing relative amounts of cross talk in the different directions, to enable the capacity benefits of using a common wavelength for both directions to be obtained while using greater optical signal power. This is particularly useful where the optical power is asymmetric, such as in WDM PON systems.

Other variations and examples can be envisaged within the claims.

The invention claimed is:

1. A method of operating a bidirectional wavelength division multiplexed (WDM) optical communications link having an optical path shared by first and second WDM signals sent in opposite directions along the shared optical path and using at least one common wavelength, the method comprising:
   receiving indications of transmission qualities of the at least one common wavelength, of the first and second WDM signals;
   optically amplifying the first WDM signal while it is separated from the second WDM signal; and
   controlling the optical amplification according to the indications of transmission quality, to alter the relative optical powers of the first and second WDM signals for mitigating crosstalk at the common wavelength.

2. The method of claim 1, further comprising separating the first and second WDM signals before the optically amplifying the first WDM signal.

3. The method of claim 1 wherein the optically amplifying the first WDM signal occurs before the first WDM signal enters the shared optical path.

4. The method of claim 3, further comprising optically amplifying the first WDM signal after it has left the shared optical path.

5. The method of claim 1, further comprising optically amplifying the second WDM signal separately from the first WDM signal.

6. The method of claim 5, further comprising:
determining which direction of transmission of the optical signals has worse transmission quality; and
thereafter, performing at least one of:
for a worse direction:
increasing the optical power level of the respective WDM signal before it enters the shared optical path; and
decreasing the optical power level of the respective optical signal after it has left the shared optical path;
for a better direction:
decreasing the optical power level of the respective WDM signal before it enters the shared optical path; and
increasing the optical power level of the respective WDM signal after it has left the shared optical path.

7. The method of claim 1, further comprising, when the method is used in a passive optical network, using a wavelength reuse transmitter to transmit a common wavelength to form part of the second WDM signal.

8. An apparatus for controlling wavelength division multiplexed (WDM) signals in a bidirectional WDM optical communications link having an optical path shared by first and second WDM signals sent in opposite directions along the shared optical path and using at least one common wavelength, the apparatus comprising:
an optical amplifier configured to amplify the first WDM signal while it is separated from the second WDM signal; and
a processing circuit functioning as a controller configured to:
receive indications of transmission qualities of the at least one common wavelength, of the first and second WDM signals;
control the optical amplifier according to the indications of transmission quality;
alter the relative optical powers of the first and second WDM signals to mitigate crosstalk at the common wavelength.

9. The apparatus of claim 8, further comprising optical circulators configured to:
separate the first and second WDM signals from the shared path; and
recombine them onto the shared path.

10. The apparatus of claim 8, wherein the optical amplifier comprises a booster amplifier configured to amplify the first WDM signal before it enters the shared optical path.

11. The apparatus of claim 8, wherein the optical amplifier comprises a pre-amplifier element configured to amplify the first WDM signal after it has left the shared optical path.

12. The apparatus of claim 8, wherein the optical amplifier is configured to pass the second WDM signal without amplification.

13. The apparatus of claim 8, wherein the controller is configured:
to determine which direction of transmission of the optical signals has worse transmission quality; and
to control the cross talk by performing at least one of the following:
for that worse direction, increasing the optical power level of the respective WDM signal before it enters the shared optical path, and decreasing the optical power level of the respective optical signal after it has left the shared optical path;
for the better direction, decreasing the optical power level of the respective WDM signal before it enters the shared optical path, and increasing the optical power level of the respective WDM signal after it has left the shared optical path.

14. The apparatus of claim 8, wherein the link is asymmetrical and comprises optical transmitters at each end that have different output optical power levels.

15. A bidirectional wavelength division multiplexed (WDM) optical communications link, comprising:
a shared optical path shared by first and second WDM signals sent in opposite directions along the shared optical path and using at least one common wavelength;
an apparatus for controlling WDM signals in the bidirectional WDM optical communications link, the apparatus comprising:
an optical amplifier configured to amplify the first WDM signal while it is separated from the second WDM signal; and
a processing circuit functioning as a controller configured to:
receive indications of transmission qualities of the at least one common wavelength, of the first and second WDM signals;
control the optical amplifier according to the indications of transmission quality;
alter the relative optical powers of the first and second WDM signals to mitigate crosstalk at the common wavelength.

16. A computer program product stored in a non-transitory computer readable medium to control a processing circuit for operating a bidirectional wavelength division multiplexed (WDM) optical communications link having an optical path shared by first and second WDM signals sent in opposite directions along the shared optical path and using at least one common wavelength, the computer program product comprising software instructions which, when executed by the processing circuit, causes the processing circuit to:
receive indications of transmission qualities of the at least one common wavelength, of the first and second WDM signals;
optically amplify the first WDM signal whilst it is separated from the second WDM signal; and
control the optical amplification according to the indications of transmission quality, to alter the relative optical powers of the first and second WDM signals for mitigating crosstalk at the common wavelength.

* * * * *